United States Patent
Raskin

(10) Patent No.: US 10,474,589 B1
(45) Date of Patent: Nov. 12, 2019

(54) METHOD AND APPARATUS FOR SIDE-BAND MANAGEMENT OF SECURITY FOR A SERVER COMPUTER

(71) Applicant: JANUS TECHNOLOGIES, INC., Half Moon Bay, CA (US)

(72) Inventor: Sofin Raskin, Los Altos, CA (US)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 366 days.

(21) Appl. No.: 15/059,077

(22) Filed: Mar. 2, 2016

(51) Int. Cl.
| | |
|---|---|
| G06F 21/62 | (2013.01) |
| G06F 12/14 | (2006.01) |
| H04L 29/06 | (2006.01) |
| G06F 9/4401 | (2018.01) |
| G06F 9/455 | (2018.01) |
| G06F 21/71 | (2013.01) |
| G06F 21/74 | (2013.01) |
| G06F 21/70 | (2013.01) |

(52) U.S. Cl.
CPC ........ G06F 12/1408 (2013.01); G06F 9/4416 (2013.01); G06F 9/45558 (2013.01); G06F 21/62 (2013.01); H04L 63/02 (2013.01); H04L 63/06 (2013.01); H04L 63/062 (2013.01); H04L 63/10 (2013.01); H04L 63/20 (2013.01); G06F 21/70 (2013.01); G06F 21/71 (2013.01); G06F 21/74 (2013.01); G06F 2009/45587 (2013.01); G06F 2009/45595 (2013.01); G06F 2212/1052 (2013.01)

(58) Field of Classification Search
CPC .......... G06F 21/62; G06F 21/70; G06F 21/71; G06F 21/74; G06F 9/4416; G06F 2212/1052; G06F 2209/45587; G06F 2009/45595; G06F 9/45558; H04L 63/062; H04L 63/10; H04L 63/2006; H04L 63/02
See application file for complete search history.

(56) References Cited

U.S. PATENT DOCUMENTS

| | | | |
|---|---|---|---|
| 6,367,035 B1 | 4/2002 | White | |
| 8,539,228 B1 * | 9/2013 | Mason | H04L 9/088 713/164 |
| 9,215,250 B2 * | 12/2015 | Porten | H04L 63/20 |

(Continued)

OTHER PUBLICATIONS

"Storage security: Encryption and Key Management," Storage Networking Industry Association, Aug. 2015, pp. 1-29 https://www.snia.org/sites/default/files/technical_work/SecurityTWG/SNIA-Encryption-KM-TechWhitepaper.R1.pdf (Year: 2015).*

(Continued)

*Primary Examiner* — Shanto Abedin
*Assistant Examiner* — Carlos M De Jesus Lassala
(74) *Attorney, Agent, or Firm* — Foley & Lardner LLP

(57) ABSTRACT

The present embodiments relate to methods and apparatuses for side-band management of security for server computers. According to certain aspects, such management is directed to the security of data that is stored under the local control of the server, as well as data that flows through the network ports of the server. Such locally stored data is secured by encryption, and the encryption keys are managed by a management entity that is separate from the server. The management entity can also manage the security of network data flowing through the server using its own configuration of network security applications such as firewalls, monitors and filters.

1 Claim, 9 Drawing Sheets

(56) References Cited

U.S. PATENT DOCUMENTS

| | | | |
|---|---|---|---|
| 9,684,805 B2* | 6/2017 | Raskin | G06F 21/85 |
| 2014/0258586 A1* | 9/2014 | Zeng | G06F 12/10 |
| | | | 711/6 |
| 2014/0331294 A1* | 11/2014 | Ramallo | G06F 21/6245 |
| | | | 726/5 |
| 2015/0058587 A1* | 2/2015 | Wang | G06F 21/72 |
| | | | 711/163 |
| 2015/0058912 A1 | 2/2015 | Raskin et al. | |
| 2015/0058975 A1 | 2/2015 | Raskin et al. | |
| 2015/0317176 A1* | 11/2015 | Hussain | G06F 3/067 |
| | | | 718/1 |
| 2017/0076081 A1* | 3/2017 | Raskin | G06F 21/34 |

OTHER PUBLICATIONS

U.S. Appl. No. 14/846,768, filed Sep. 5, 2015, Raskin.

* cited by examiner

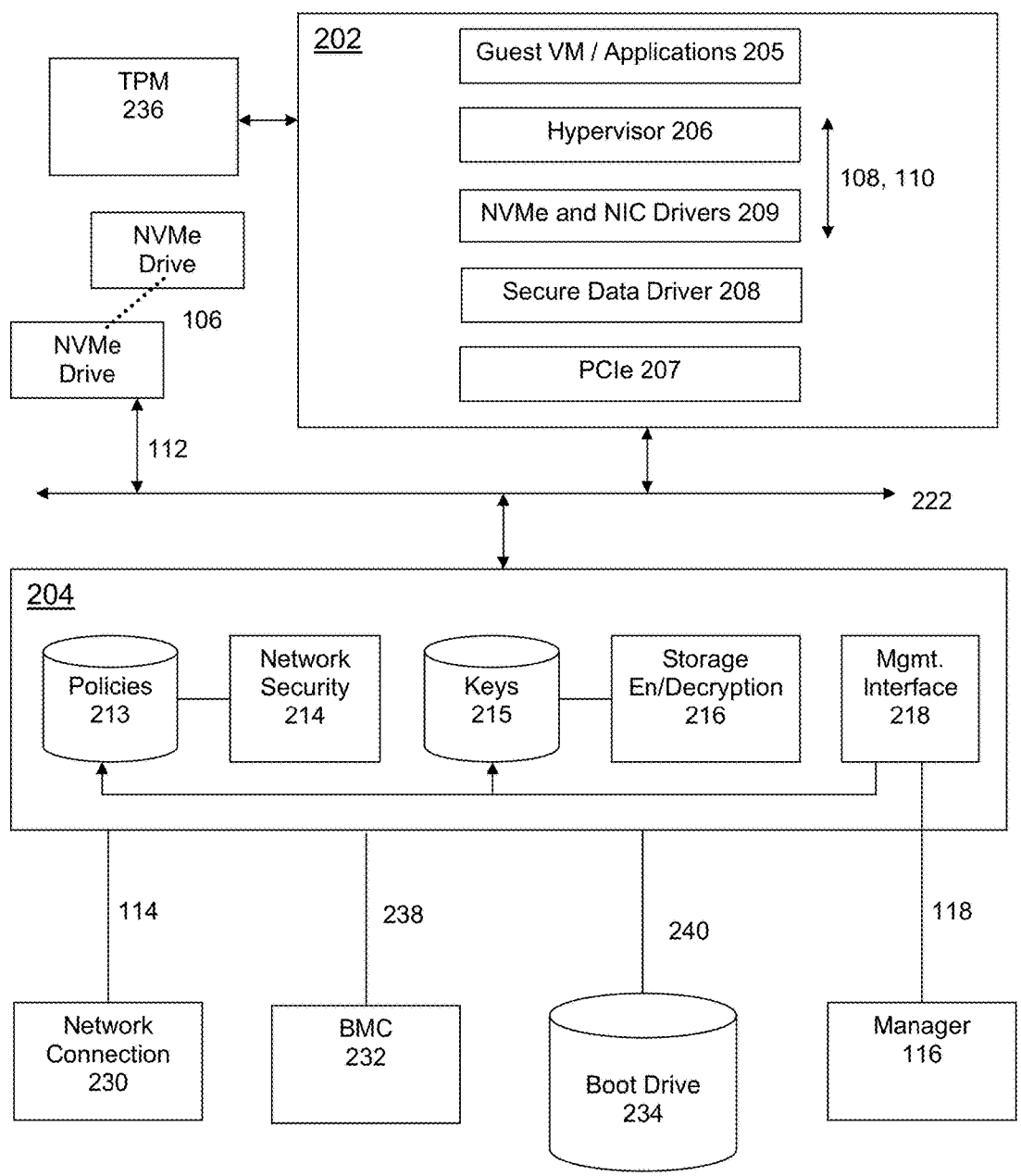

METHOD AND APPARATUS FOR SIDE-BAND MANAGEMENT OF SECURITY FOR A SERVER COMPUTER

TECHNICAL FIELD

The present invention relates generally to network computing and more particularly to a method and apparatus for managing the security of a server computer.

BACKGROUND OF THE RELATED ART

Security is one of IT's greatest challenges today. For example, conventional network firewalls and Internet Provider Security (IPS) appliances are not able to protect users' data and critical infrastructure from sophisticated and targeted advanced persistent threats (APTs).

Meanwhile, application service providers and cloud applications offer many benefits to organizations, introducing substantial economies of scale. Currently, customers must rely on these providers and applications to provide security for the data managed by these applications. However, given the conventional inabilities to protect users' data in the cloud and/or in data centers, such organizations are left with the assumption that their networks will be breached, and therefore are reluctant to take advantage of such application service providers and cloud applications.

Relatedly, many conventional server systems include remote management functionality such as a Board Management Controller (BMC) and/or IPMI functionality, including techniques described in U.S. Pat. No. 6,367,035. These components and functionalities are notoriously well known as being vulnerable to hacks and other security breaches.

There is therefore a need for allowing customers themselves to make sure the user data operated on by the server computers used by application service providers and cloud applications is secure.

SUMMARY

Embodiments of the invention relate to methods and apparatuses for side-band management of security for server computers. According to certain aspects, such management is directed to the security of data that is stored locally at the server, as well as data that flows through the network ports of the server. The locally stored data is secured by encryption, and the encryption keys are managed by a management entity that is separate from the server. Moreover, access to the locally stored data by applications running on the server is controlled by a secure complex interposed between the applications and the locally stored data. The management entity can also manage the security of network data flowing through the server using its own configuration of network security applications such as firewalls, monitors and filters, which can be established on a per-virtual machine or per-application basis.

In accordance with these and other aspects, a secure computer system according to embodiments of the invention includes a host complex for running software applications that generate and use data, a secure complex, storage for the data that is generated and used by the software applications and an external management entity that communicates with the secure complex. The secure complex is configured to prevent access by the applications to the data in the storage unless and until the storage, by way of the secure complex and the external management entity, is provisioned. Access to the storage can be revoked at any time by the external management entity.

In additional furtherance of these and other aspects, a method according to embodiments of the invention includes running software applications that generate and use data on a host complex of a server system, provisioning storage for the data by an external management entity, and preventing access by the applications to the data in the storage unless and until the storage is provisioned by the external management entity.

BRIEF DESCRIPTION OF THE DRAWINGS

These and other aspects and features of the present embodiments will become apparent to those ordinarily skilled in the art upon review of the following description of specific embodiments of the invention in conjunction with the accompanying figures, wherein:

FIG. 3 is a block diagram further illustrating an example secure server system according to embodiments of the invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects of the invention, embodiments of the present invention relate to side-band management of security and other operational features of server computers. An aspect of this side-band management is that it establishes a balance of power between the operator of the server (e.g. a cloud application service provider center or a data center) and an owner or consumer of data generated or used by the sever.

Figure 1:
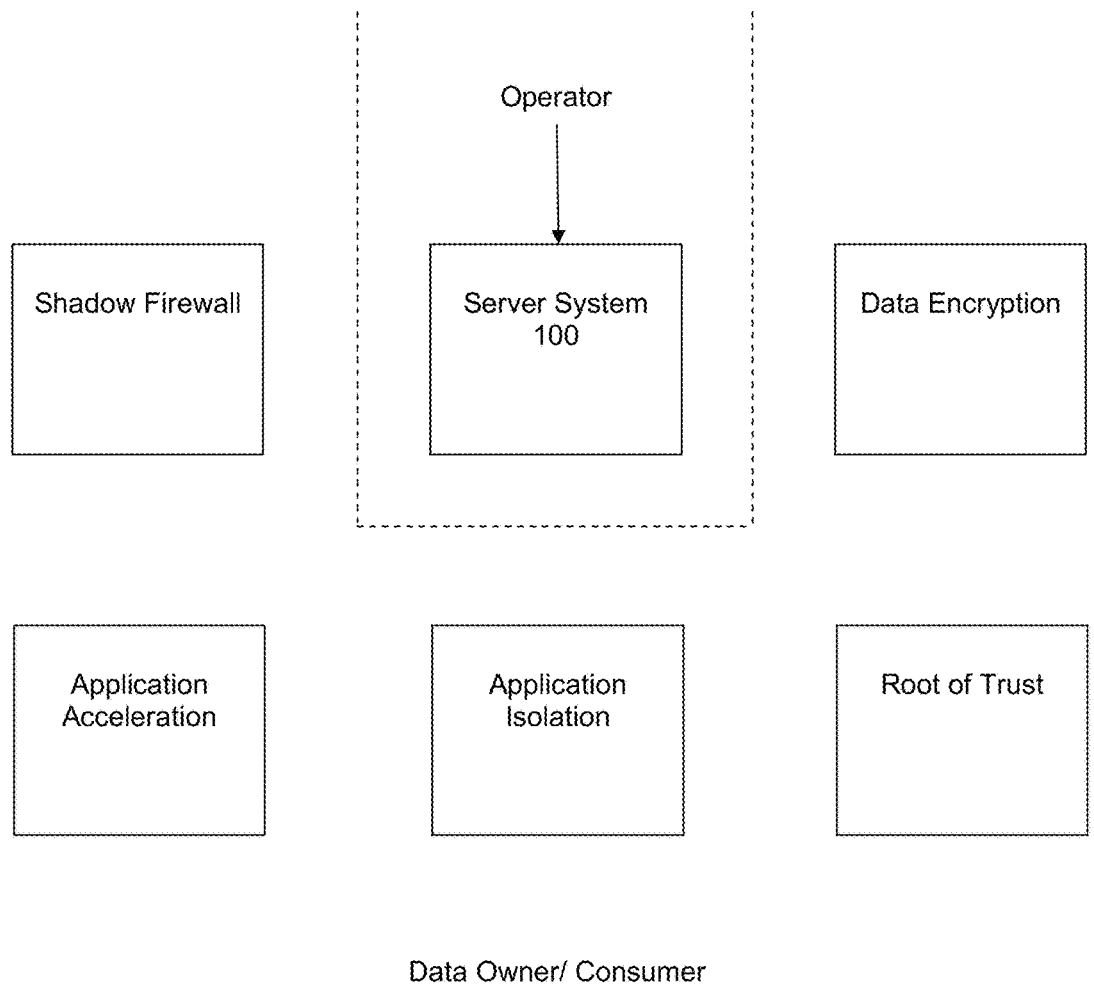
FIG. 1 is a functional block diagram illustrating server system balance of power features of embodiments of the invention.

To assist in understanding these and other balance of power aspects of the invention, FIG. 1 is a functional block diagram illustrating an example system according to embodiments of the invention.

As illustrated in FIG. 1, server system 100 is owned and operated by an operator such as a cloud application service provider center or a data center in a conventional fashion. Meanwhile, certain security and other operational features of system 100 are managed or controlled by a data owner or consumer. As shown, these features can include a shadow firewall for network communications involving server system 100 (e.g. enforcing specific network profiles for host applications and virtual machines operating on server system 100), encryption of data generated, used and stored by applications running system 100 on behalf of the data owner or consumer, acceleration of certain applications that are desired by the data owner or consumer, isolation for certain applications that are desired by the data owner or consumer, and providing a root of trust for system 100 on behalf of the data owner or consumer. According to certain aspects, this root of trust can include providing a secure boot mechanism for system 100, providing a secure BIOS for operation of system 100, and providing a secure BMC for allowing certain conventional side-band management features of system 100.

As further illustrating FIG. 1, the operator of server system 100 is effectively walled off from accessing or controlling the additional security and other operational features of system 100 according to embodiments of the invention. Instead, such access or control is placed in the hands of the data owner or consumer. It should be noted that the operator and data owner or consumer are shown separately for illustrating aspects of the invention. However, it should be noted that in some embodiments, there can be a contractual or other relationship between the two. For example, an operator can provide the security and other operational features of system 100 to a data owner or consumer as a premium service.

As set forth above, in embodiments, certain side-band management aspects of the invention involve both the security of data that is stored locally at the server, as well as data that flows through the network ports of the server. Such locally stored data is secured by encryption under the transparent control of a secure complex interposed between server applications and the data, and the encryption keys are managed by a management entity that is separate from the server. The management entity can also manage the security of network data flowing through the server using its own configuration of network security applications such as firewalls, monitors and filters, which security applications can be established on per-virtual machine or per-application basis.

Figure 2A:
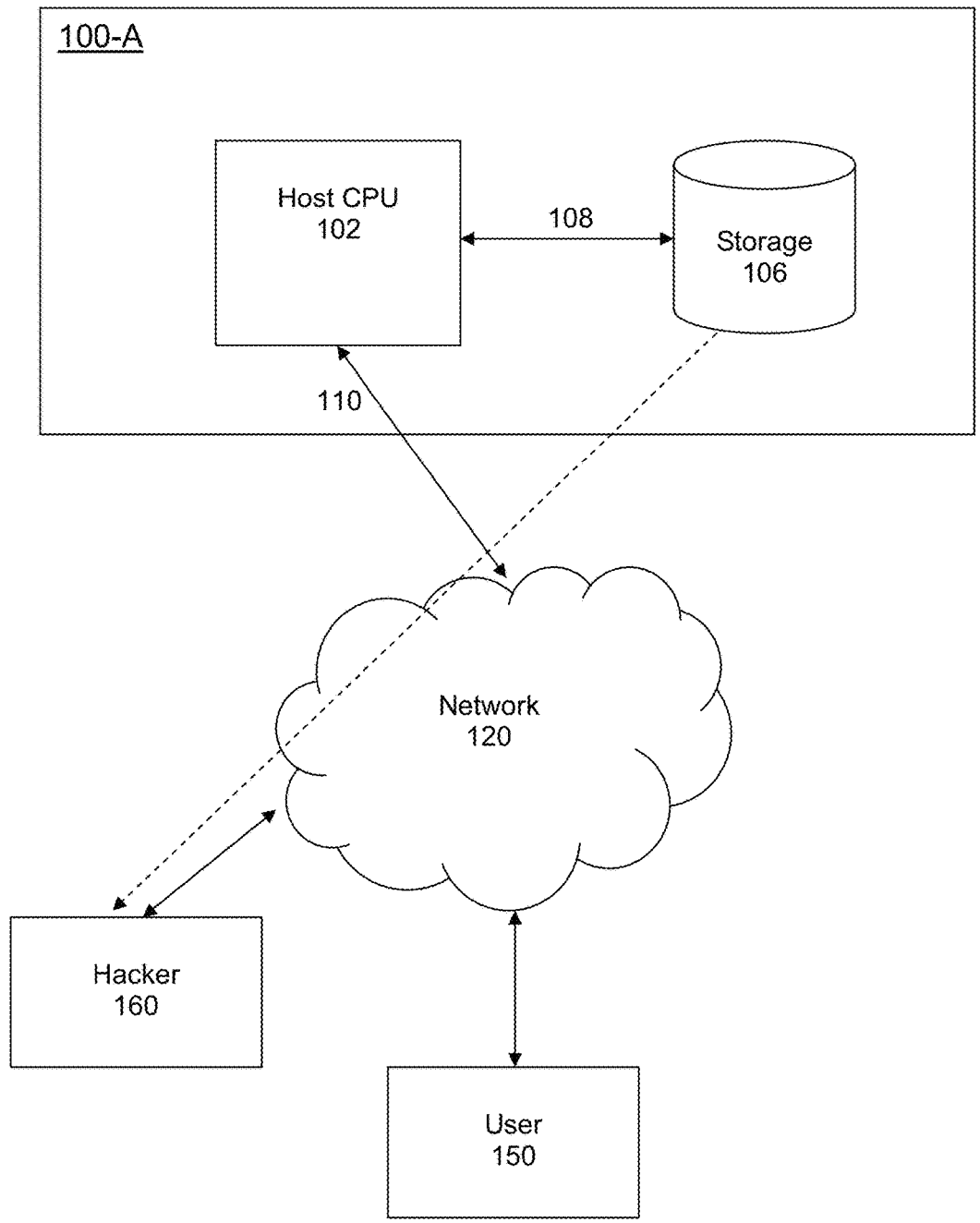
FIG. 2A is a block diagram illustrating a conventional server computer system.

To assist in illustrating these and other security aspects of the invention in alternative detail, FIG. 2A is a block diagram illustrating an example conventional server system 100-A. Such a system 100-A can be included in a cloud application service provider center or data center. As shown, in such a conventional system, a host CPU 102 (e.g. an x86 processor) and associated software typically controls access to customer data in storage 106 via storage interface 108. System 100-A further allows clients such as user 150 to access the customer data in storage 106 via network 120 and the system's network interface 110.

Network 120 can include any combination of wired and wireless media and/or carriers, and can be implemented by various types and/or combinations of public (i.e. Internet) and private local or wide area networks using proprietary protocols running on top of conventional protocols such as HTTP, UDP and/or TCP.

Network interface 110 in these examples can depend on the type of network 120 and can include Ethernet, Gigabit Ethernet MAC and other interfaces, NICs, fiber and copper connections, etc.

In these and other examples, users 150 can access system 100-A using any conventional computing device (e.g. desktop PC, notebook, thin client, tablet computer, smart phone, etc.) with network access devices such as wired or wireless modems, network interfaces, wireless transceivers, etc. and associated client software (e.g. browsers, virtualization software, etc.).

Storage 106 can be any combination of optical, magnetic or semiconductor (e.g. flash) non-volatile memory and can include rotating and/or solid state disk drives, storage arrays (e.g. RAID), network accessed storage (NAS), storage area networks (SAN), direct attached storage (DAS), etc. It should be noted that, although shown local to system 100-A, storage 106 may also or alternatively include storage devices that are remotely accessed by host CPU 102, such as via a local or wide area network.

In these and other examples, storage interface 108 can include standard disk drive interfaces such as SATA, SAS, etc., non-volatile memory interfaces such as non-volatile memory express (NVMe) and other interfaces that can depend on the type of media that implements storage 106.

It should be noted that, although shown separately for illustration purposes, interfaces 108 and 110 in some embodiments may use a common physical interface such as a common PCIe or other expansion bus.

The present inventors recognize that a conventional server system 100-A such as that shown and described above can include various network security mechanisms such as firewalls and authentication procedures and the like. However, given the need to allow users such as user 150 to readily access their data in storage 106 via network 120, system 100-A is vulnerable to access by unauthorized users such as hacker 160. As such, it is possible for hacker 160 to also obtain unauthorized access to customer data in storage 106 via network 120.

Figure 2B:
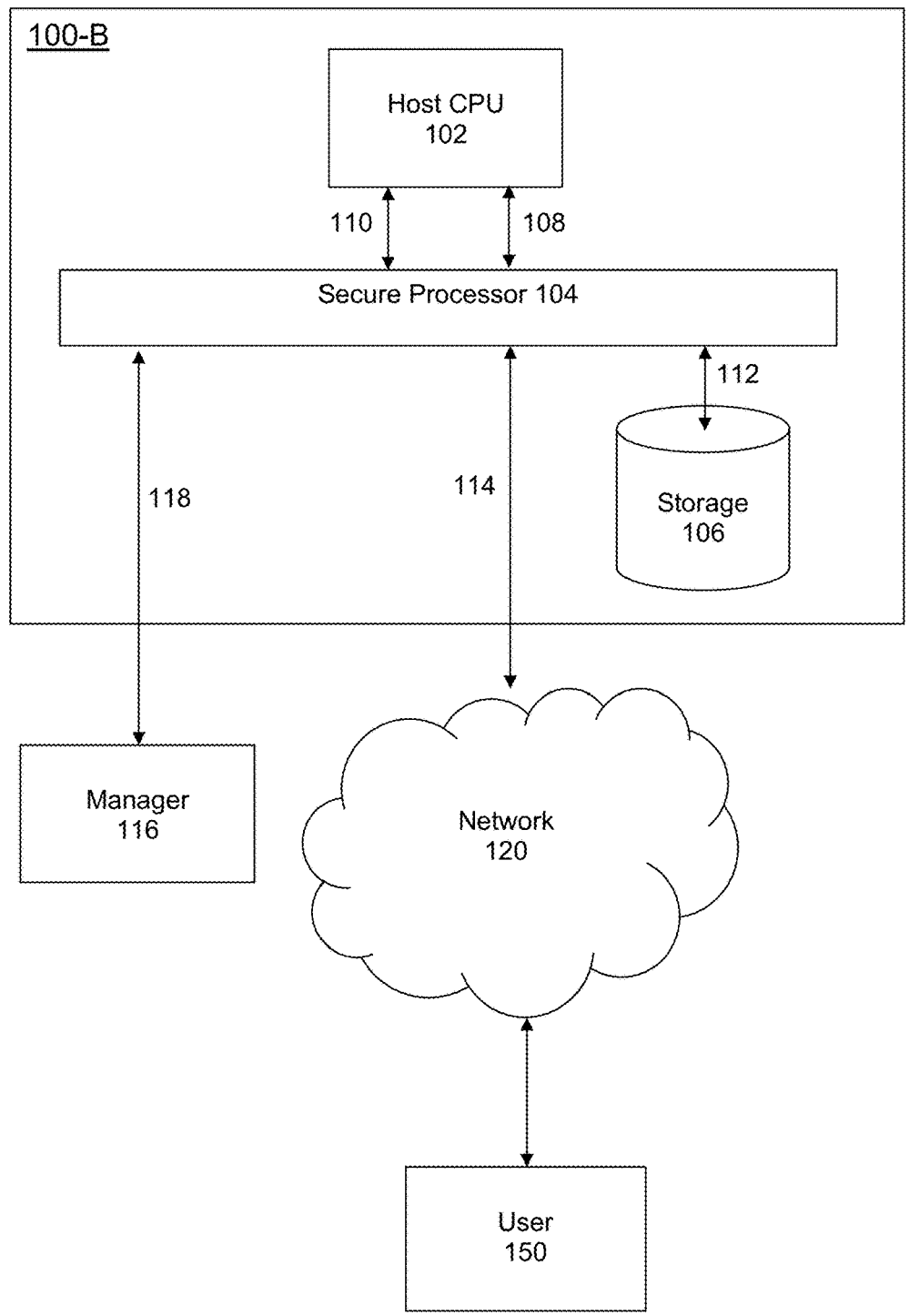
FIG. 2B is a block diagram illustrating a secure server system according to embodiments of the invention.

FIG. 2B is a block diagram illustrating an example secure server system 100-B according to embodiments of the invention.

As shown in FIG. 2B, system 100-B includes a secure subsystem 104 that intercepts and manages the host CPU 102's storage interface 108 and network interface 110. These interfaces are redirected and secured via the secure processor 104's own storage interface 112 and network interface 114 in a manner to be described in more detail below. As further shown in FIG. 1B, secure subsystem 104 further includes a management interface 118 that allows the security functions performed by secure subsystem 104, including secure interfaces 112 and 114, to be managed by a separate management entity 116.

According to aspects of the invention, the ability of management entity 116 to manage the security of system 100-B is referred to herein as "side-band" management and control. More particularly, this management and control is completely independent from the host CPU 102 and any applications running on it. When allowed by secure subsystem 104 (i.e. in a process called "provisioning" to be described in more detail below), host CPU 102 in system 100-B operates in the same fashion and uses interfaces 108 and 110 in the same manner as the host CPU 102 in system 100-A and is essentially unaware of the enhanced security provided by secure subsystem 104.

The side-band management and control aspects of the invention can be exploited in many useful and novel ways. For example, manager 116 and user 150 may both be members of the same organization, and the organization may be a separate entity from the organization that owns and operates server system 110-B. In this example, the organization (e.g. an application service provider such as Salesforce.com) that owns and operates server system 110-B can provide the additional security of secure subsystem 104, as well as the side-band management and control thereof, as a premium service. As another example, the user 150 may not want a service provider that operates server system 110-B to have access to his/her data in storage 106, and may wish to have the ability to revoke access by the server to the data at any time.

FIG. 3 is a block diagram further illustrating an example embodiment of a secure server system 100-B according to aspects of the invention.

As shown in FIG. 3, system 100-B includes a secure complex 204 (corresponding in some aspects to secure subsystem 104) operationally interposed between host complex 202 (corresponding in some aspects to host CPU 102) on one side and network connection 230 and storage 106 on the other side.

In this example of secure system 100-B, host complex 202 includes a hypervisor 206 (e.g. a KVM Linux Hypervisor or other conventional hypervisor provided by Xen or VMware) which executes on an x86 processor from Intel Corp. or AMD (not shown). Host complex 202 further includes a Peripheral Component Interconnect Express (PCIe) interface 207 to an external PCIe bus 222. Access to interface 207 by hypervisor 206 is facilitated by operating system and other software drivers 209, which can include conventional x86 drivers such as PCIe drivers, network interface card (NIC) drivers, and NVMe drivers. In the example system 100-B shown in FIG. 3, the driver layer further includes secure data driver 208, aspects of which will become apparent from the descriptions below. In general, however, in these and other embodiments, driver 208 acts to intercept and redirect storage and network data accesses by the operating system and applications of host complex 202 (e.g. shown as interfaces 108, 110) so that they are secured by secure complex 204 in a manner that will be described in more detail below.

The example of FIG. 3 further shows that host complex 202 also includes applications 205 executed by a CPU in host complex 202. These applications 205 are executed in a conventional fashion to access data in storage 106 (implemented by a plurality of NVMe solid state drives (SSDs) as shown in this example) and communicate with users via hypervisor 206, drivers 209 and network connection 230. According to aspects of the invention, these applications 205, as well as hypervisor 206 and conventional drivers 209, are completely unaware of the presence of secure complex 204 and the security functions performed thereby to be described in more detail below.

Applications 205 can depend on the type of organization that owns and operates system 100-B and can include virtual machines, web server applications, data center applications, cloud applications, Software as a Service (SaaS), Platform as a Service (PaaS) or Infrastructure as a Service (IaaS).

It should be noted that host complex 202 can include other components such as program and data memory (e.g. DDR memory) for running applications 205, power control circuitry, etc. However, the details thereof will be omitted here for sake of clarity of the invention.

As further shown in the example of FIG. 3, secure complex 204 includes a network security module 214 and a storage encryption/decryption block 216, the functionalities of both of which will be described in more detail below. In general, however, as shown in FIG. 3, module 214 performs network security functions (e.g. firewall, filtering, statistics gathering, etc., i.e. "shadow firewall") in accordance with policies 213 and block 216 performs accelerated encryption and decryption of data stored in and retrieved from storage 106 using keys 215. According to aspects of the invention, these policies 213 and keys 215 can be managed by a remote manager 116 via management interface 218 in a side-band fashion as mentioned above. The sideband interface could be 1 Gb Ethernet or embedded PCIe endpoint connection.

Network connection 230 in this example is implemented by an enhanced small form-factor pluggable (SFP+) connector for 10 GbE fiber. However, the invention is not limited to this example and can include connections to other bandwidths and media such as 40 GbE or 100 GbE.

In embodiments such as that shown in FIG. 3, secure complex 204 is implemented as an FPGA or ASIC (e.g. a SPU6110 secure processor from Janus Technologies, Inc.) mounted on a PCIe card which is inserted in a conventional PCIe slot and thereby connected in a conventional fashion to the PCIe interface 207 of host complex 202. Although not shown, such an FPGA or ASIC can include a processor core running an embedded BIOS and operating system (e.g. Linux) software and application software stored in secure memory also mounted on the PCIe card for managing module 214, block 216 and interface 218, among other things. As such, host complex 202 does not include any direct connections to network 120, storage 106 or other peripherals outside of complex 202 except perhaps its own program memory for hypervisor 206 and applications 205. Rather, some or all of the connections are emulated by and presented to the host complex 202 via the PCIe interface 207 and secure complex 204, completely transparently to hypervisor 206 and applications 205 running on host complex 202.

As further shown in FIG. 3, and to be described in more detail below, system 100-B according to embodiments of the invention include a trusted platform module (TPM) 236 connected to the host complex 202, a BMC module 232 connected to the secure complex 204 via interface 238 and a boot drive 234 connected to secure complex 204 via interface 240. In embodiments, TPM 236, BMC module 232 and boot drive 234 are implemented by well known conventional components, and so further details thereof will be omitted here for sake of clarity of the invention.

In these and other embodiments, system 100-B can be implemented by a 2U, 2P rack-mounted server. The server can include a motherboard on which the host complex 202 is mounted together with TPM 236 and BMC 232, and a connected PCIe bus with slots for accepting a PCIe card containing secure complex 204. The server can further contain a bay(s) of solid state or other disk drives for implementing storage 106 and a bay(s) for other solid state or other disk drives for implementing application and operating system storage for complex 202 in boot drive 234.

Figure 4:
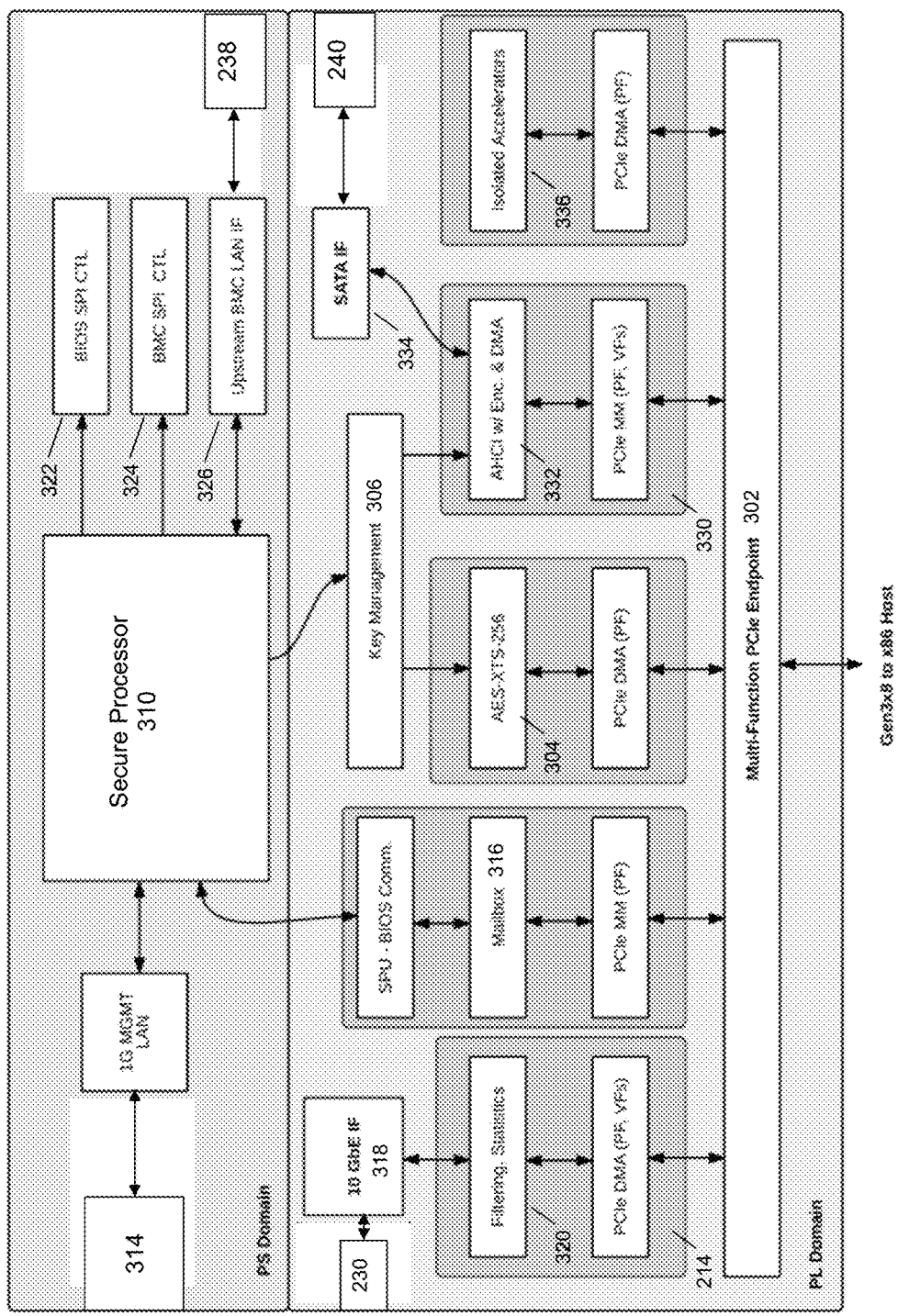
FIG. 4 is a block diagram further illustrating an example secure complex in a secure server system according to embodiments of the invention such as that shown in FIG. 3.

FIG. 4 is a block diagram further illustrating an example secure complex 204 in accordance with embodiments of the invention.

As set forth above in connection with FIG. 3, in example embodiments, the components of complex 204 are mounted on a common PCIe card that is inserted in a PCIe slot in PCIe bus 212. In these examples, the physical connections to the host complex 202 and storage 106 (e.g. four separate NVMe SSDs) are implemented by a PCIe Gen3×8 connection. Network connection 230 in this example is implemented by an enhanced small form-factor pluggable (SFP+) connector for 10 GbE fiber. Meanwhile, management interface 218 includes a 1000Base-T for 1 GbE over copper interface 314 and 1 GbE MAC interface 312.

An important function of secure processor 310 is to interface with the external management entity 116, initially setup the keys for the system as described in more detail below, and provide board status and debug capabilities. The embedded CPU of secure processor 310 in example embodiments is implemented by a Corex-A ARM CPU. It contains a MMU, L1 and L2 caches, and memory interfaces to DDR4 memory (not shown) for storage of various data accessed and/or managed by secure complex 204 (e.g. CPU code, BIOS image, video memory, memory for locally storing network statistics, etc.) as will become more apparent from the descriptions below. The ARM CPU runs a Linux Operating System, and boots securely from a dedicated SPI flash (not shown).

In embodiments such as will be described in more detail below, the connection to the manager 116 via interfaces 312 and 314 is implemented by a secure VPN connection running on secure processor 310. Via communications between processor 310 and block 320, the manager 116 will thus be able to gather statistics and report information about the system, as well as facilitate control and monitoring functions by configuring policies 213 (not shown) used by block 320.

In embodiments, the Multifunction PCIe endpoint 302 is a PCIe multifunction endpoint device. As shown, the PCIe functions coupled to endpoint 302 include network security module 214, secure BIOS module 318, encryption/decryption module 216, secure boot drive module 330 and accelerator module 336. As shown, each of these PCIe functions includes its own DMA or other mechanism such as memory mapped (MM) exchanges to facilitate data transfers over PCIe bus 212.

As set forth above, encryption/decryption module 216 performs encryption of data stored in storage 106 by applications 205, as well as decryption of data retrieved from storage 106 by applications 205, thereby implementing secure data interface 112. As further set forth above, in the example where storage 106 is implemented using NVMe storage, applications 205 and hypervisor 206 use conventional NVMe drivers 209 to perform data accesses. These accesses are intercepted and directed by secure data driver 208 to be described in more detail below.

As is known, the NVMe software architecture is based on a paired Submission and Completion Queue mechanism. Commands are placed by NVMe driver 209 software into the Submission Queue. Completions are placed into an associated Completion Queue by the controller. Multiple Submission Queues may utilize the same Completion Queue. The Submission and Completion Queues are allocated in host memory.

A data access to data on the NVMe SSDs implementing storage 106 involves driver 208 according to the invention interacting with the data payloads defined by the queues setup by the NVMe driver 209. The NVMe driver software is responsible for creating queues in host memory (Admin, Submission, Completion), up to the maximum supported by the controller. There can be one or more Submissions Queues to every Completion Queue.

The Submission Queue is a circular buffer than contains commands to be executed by the NVMe controller. These commands contain pointers to the data payloads to be used in the data transfer (command may contain up to two Physical Region Page entries).

In the case of all NVMe write operations, secure data driver 208 causes the payload to be encrypted through the encryption/decryption module 216 before the NVMe controller executes the command, and reads the data from host memory. This involves a separate PCIe DMA access to the encryption/decryption module 216 to encrypt the data bound for the designated SSD before data can be written committed to the SSD in storage 106.

In the case of all NVMe read operations, secure data driver 208 inserts itself in-between the completion message, and the host software. Before host software consumes the payload, a separate PCIe DMA access to the encryption/decryption module 216 to decrypt the data from storage 106 and bound for host software is performed.

In one example implementation of module 216, there is one AES-XTS-256 module 304 for each SSD in storage 106. In these examples, for each NVMe SSD drive, there is one unique AES-XTS key pair for encryption/decryption. It should be noted that, in some embodiments, it is possible that the server can include other storage devices (e.g. SSDs) for which data is not secured by complex 204.

In embodiments, the key material for AES-XTS encryption/decryption consists of a 256-bit data encryption key (used by the AES block cipher) as well as a 256-bit "tweak key" (i.e. XTS key) that is used to incorporate the logical position of the data block into the encryption. In embodiments, the physical information from the drive (LBA, for example) is used to determine the initialization vector (IV) value for the tweak key. Other possible information for the tweak key can include drive serial number, model number, vendor ID, etc.). Another possible source for the tweak key is directly from the silicon of the secure complex 204 itself, such as from a Physically Unclonable Function.

Key management module 306 is responsible for loading the appropriate keys 215 from the secure processor 310 into the modules 304 during each boot process, as enabled by secure processor 310 and as will be described in more detail below. Key management module 306 also stores state information for the keys.

Further example implementation aspects of performing encryption and decryption of data in storage 106 according to embodiments of the invention are described in co-pending U.S. application Ser. No. 13/971,732, the contents of which are incorporated by reference herein in their entirety. Some limitations of the above approaches should be noted, however. For example, where each AES-XTS encryption module 304 has 128-bit data input, all data units must be a multiple of 128-bit (16 bytes). However, the PCIe specification supports transaction sizes as small as 1B, and Byte Enable support. Practically speaking, the smallest packet size used in storage devices is 512B, and embodiments make this assumption here.

Returning to FIG. 4, network security module 214 in this example includes a network interface card (NIC) 318 and a security and statistics block 320.

In embodiments, NIC 318 is implemented by a 10 GbE Network Interface Card with DMA. The function of this block is to provide high-speed network interface functions for the host complex 202, with support for in-line security monitoring and filtering functions performed by block 320. In embodiments, the 10 Gb Ethernet interface is setup as a RXAUI at 2×6.25 Gb/s line rate to achieve 10 Gb/s data rate. This PCIe function presents itself as a PCIe 10 GbE network adapter using a standard available driver in drivers 209.

According to some aspects, given that the 10 GbE network interface, and all other interfaces, for that matter, are standard, they do not require custom software when applications 205 attempt to access any peripherals, and can rely on stock OS drivers 209. In other embodiments, if the on-chip DMA and NIC 318 require non-standard proprietary drivers, then an external PCIe/MAC/PHY with standard drivers can be included in complex 204, and Ethernet can flow back into the complex 204 for security functions.

The in-line security monitoring and filtering functions (i.e. "shadow firewall") are performed on the Ethernet data stream in block 320 downstream from the MAC 318. The functions performed by module 320 include hardware accelerated VPN's, statistics gathering (e.g. including per-virtual machine and other per-application 205 based statistics), port blocking functions (e.g. blocking of unauthorized users and applications 205) and network filtering (e.g. including per-virtual machine and other per-application 205 based filtering). Example implementation aspects of these functions can be found in co-pending U.S. application Ser. Nos. 13/971,582 and 13/971,604, the contents of which are incorporated by reference herein in their entirety. These functions are performed in accordance with policies 213 (not shown in this diagram), which policies can be received and configured by manager 116 via management interface 218. Example implementation aspects of these policies and/or remotely configuring these policies can be found in U.S. Pat. No. 9,215,250, the contents of which are incorporated by reference herein in their entirety.

Figure 5:
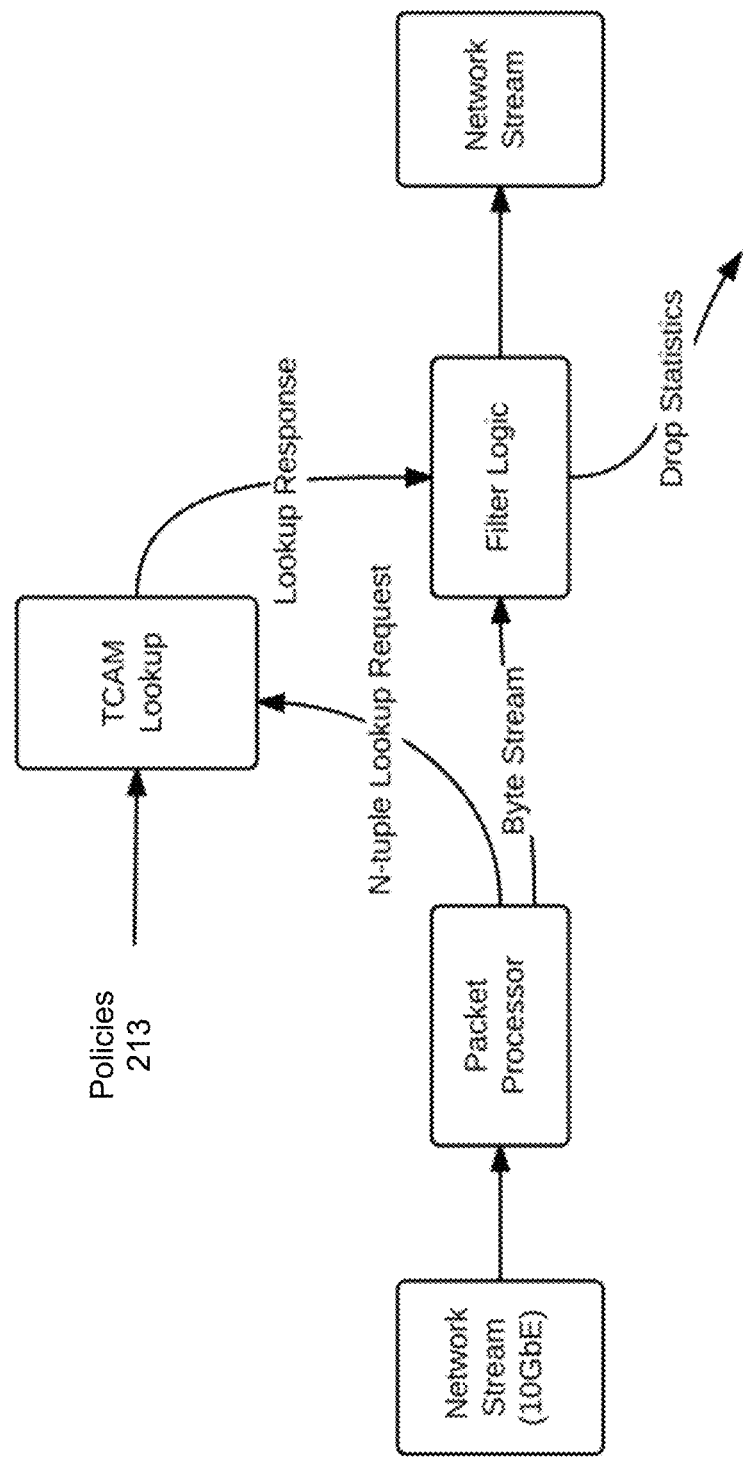
FIG. 5 is a block diagram illustrating network filtering functions that can be performed in a secure server system according to embodiments of the invention such as that shown in FIG. 3.

FIG. 5 is a diagram illustrating example aspects of network filtering functions performed by block 320. As shown, for these functions, block 320 completely intercepts the network stream. First, a packet processor identifies packets in the stream, and extracts an N-tuple from the packets. The N-tuple is provided to a TCAM lookup which compares the contents of the N-tuple to specific terms identified in policies 213. Depending on the result of the lookup, a filter logic block either passes the packets associated with the N-tuple or causes them to be dropped. It should be noted that other information about the network stream in addition to the N-tuple can be obtained and used to filter packets. For example, information about specific virtual machines and applications associated with the stream can be obtained from the network endpoint and used.

Figure 6:
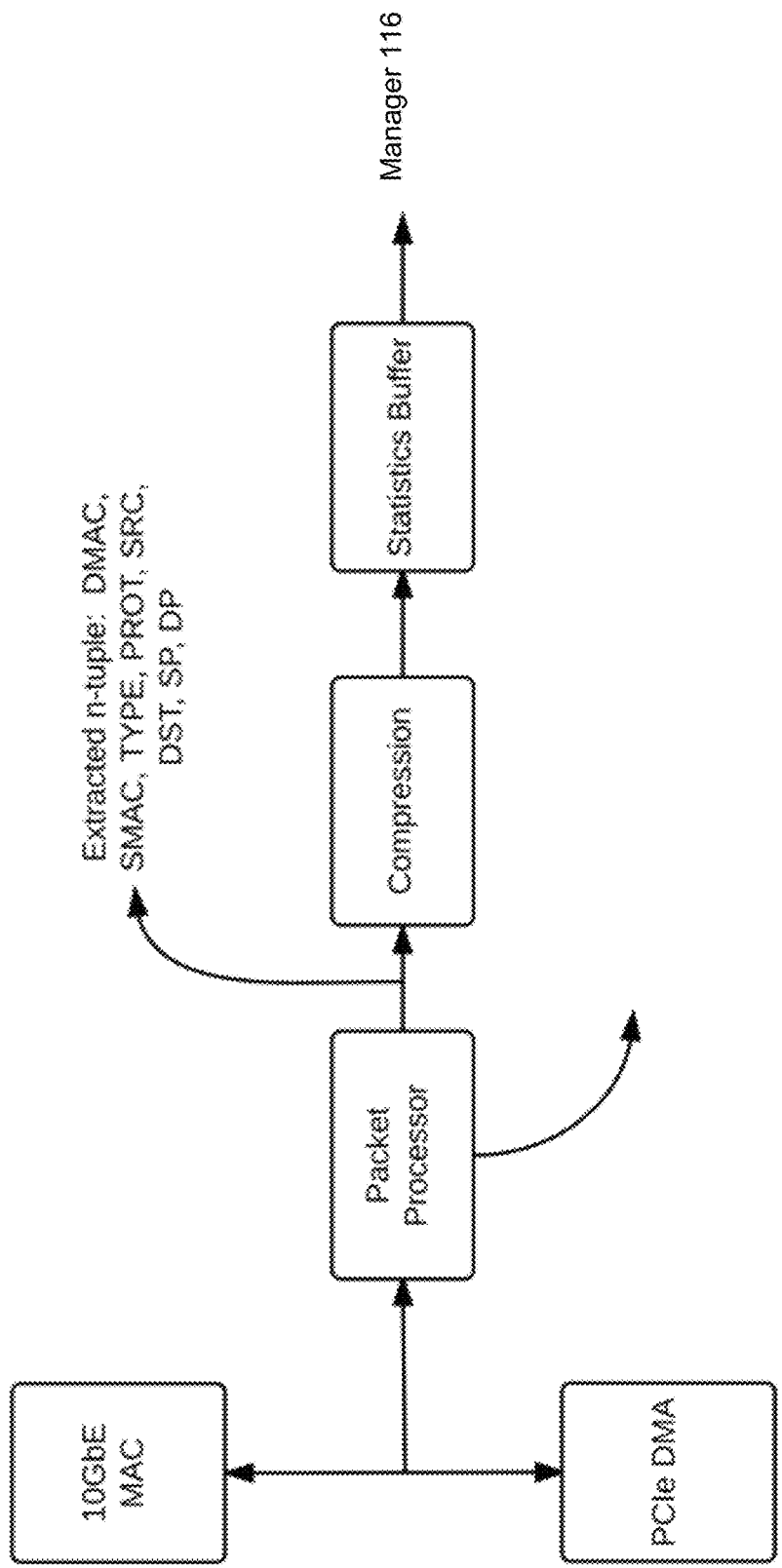
FIG. 6 is a block diagram illustrating network statistics functions that can be performed in a secure server system according to embodiments of the invention such as that shown in FIG. 3.

FIG. 6 is a diagram illustrating example aspects of network statistics functions performed by block 320. As shown, for these functions, block 320 does not intercept the network stream. Instead it inspects the stream, first with a packet processor that identifies packets, extracting an N-tuple from the packets, and updating statistics based on the MAC data in both the egress and ingress directions. Next the contents are compressed with a compression block and stored in a statistics buffer. The contents of the buffer can be uploaded to the manager 116, for example periodically or on an on-demand basis. As set forth above, it should be noted that other information about the network stream in addition to the N-tuple can be obtained and used to collect statistics. For example, information about specific virtual machines and applications associated with the stream can be obtained from the network endpoint and used.

In embodiments such as the example of FIG. 4, secure complex 204 can include a secure BIOS module 318 for implementing a secure boot mechanism such as one of those described in co-pending U.S. application Ser. No. 14/846,768, the contents of which are incorporated herein by reference in their entirety. In these and other embodiments, the primary method for communication between the host CPU's BIOS and the secure complex 204 is the PCIe shared mailbox 316. It is via the shared mailbox that secure processor 310 can send commands to the host complex 202 CPU's BIOS, and in turn, secure processor 310 receives commands from the BIOS. Those skilled in the art will be able to adapt a BIOS for a host CPU and secure processor 310 for use in the present invention after being taught by the examples below.

The function of endpoint mailbox 316 is to provide mailbox communications between embedded secure processor 310 and host CPU 206. In embodiments, this PCIe endpoint is a memory-mapped AXI interface into a shared internal BRAM array (not shown). Support for bidirectional interrupts is provided to facilitate CPU-CPU communication. One feature that would require the memory-mapped mailbox is loading of the host complex 202 CPU's BIOS from the secure complex 204, as will be described in more detail below. This interface may use an embedded DMA to conduct fast loading of the BIOS, if required. The targeted configuration for this endpoint would be PCIe Gen2×1.

In example embodiments, the BIOS image is stored in a SPI Flash memory mounted on the PCIe card implementing secure complex 204. The host complex 202 includes a SPI connection which is terminated by a secure, tamper resistant connector on the motherboard. A cabled interface runs from this connector to another tamper resistant connector on the PCIe card implementing secure complex 204. On the Janus SPU PCIe card, one port of a dual-ported SPI Flash allows for the x86 host to access the BIOS image in the via SPI lines in the PCIe card to the PCIe card connector attached to the cabled interface (not shown). The other port of the dual-ported SPI flash also allows the secure processor 310 to update and authenticate the BIOS image via BIOS SPI CTL interface 322, if required during the provisioning step and as described in more detail in the co-pending application.

On the motherboard, TPM 236 is used to store keys and authenticate the BIOS at run time. Only authenticated BIOS images have access to the TPM, and with the shared secret in the TPM, a challenge/response authentication cycle can take place between the secure processor 310 and BIOS during boot via mailbox 316, as described in more detail in the co-pending application. This authentication cycle provides confidence that the executed image was authentic.

Returning to FIG. 4, example embodiments according to secure BMC aspects of the invention include BMC SPI CTL interface 324 and upstream BMC LAN interface 326. In general, these components are used to provide authentication and management over the BMC firmware image for the BMC 232, as well as providing firewalling functions for the BMC 232's LAN interface. The interface 324 allows the secure processor 310 to update and authenticate the BMC firmware image, if required during the provisioning step.

In embodiments, the SPI signal lines and LAN interface signal lines connected to the BMC 232 are terminated at a connector on the motherboard of system 100-B. A cable runs from this connector to the PCIe card implementing secure complex 204, with tamper resistant connectors on both ends.

As is known, BMC 232 performs a number of duties to manage the server motherboard, such as monitor voltages, temperature, sensors, as well as providing some remote management features, such as remote shutdown. The standard BMC typically contains at least one, sometimes two, networking interfaces, one dedicated LAN interface, and another shared with the x86 LAN. In embodiments according to the invention, the only network interface on the BMC 232 is routed to the PCIe card implementing the secure complex 204 as described above to allow for the secure complex 204 to apply additional security features on the network interface for the BMC 232. Via the upstream BMC LAN interface 326, the secure processor 310 provides NAT and firewalling capabilities, or even additional management features, if needed. In this approach, there are no other Ethernet connections to the BMC 232 besides the one routed through the secure processor 310 to management interface 314.

In addition to the network interface 326, the BMC 232's SPI Flash interface is also connected to the PCIe card implementing secure complex 204 as described above. Meanwhile, the BMC SPI CTL interface 324 provides the secure processor 310 with the capability of updating and verifying the BMC firmware stored in SPI Flash on the PCIe card (not shown), similar to the secure boot features of the invention as described above. Since the BMC Flash will have two separate masters, there will need to be a control mux circuit to share access to the SPI Flash (not shown). The secure processor 310 controls the mux, such that the secure processor 310 could read back the contents of the BMC SPI Flash, to verify that the BMC firmware is authentic and genuine. The secure processor 310 also has the ability to reset the BMC 232 via the BMC SPI CTL interface 324, in the event it detects a problem in the BMC operation.

Returning to FIG. 4, secure boot drive module 330 provides authentication and management over the boot drive 234 for the host complex 202 of system 100-B. This module includes an in-line encryption block 332 managed by secure processor 310 and provides a method to update and overwrite the boot image if required during the provisioning step. Encryption block 332 transparently encrypts and decrypts all data written to and read from the boot drive 234 via interface 240 using encryption keys loaded by key management module 306 and possibly using techniques described in more detail in co-pending application Ser. No. 13/971,732, the contents of which are incorporated by reference herein in their entirety. As further shown, module 330 includes a standard SATA interface 334 that is presented to host complex 202 as a PCIe function via endpoint 302 for allowing the host complex 202 to access data from boot drive 234 using conventional driver software 209.

Accelerator module 336 allows secure processor 204 to provide a heterogeneous compute platform that can be leveraged by off-loading applications running on the host complex 202. In embodiments, secure complex 204 is, at least partly, FPGA-based, and thus will contain reconfigurable FPGA resources, some of which can be reserved for off-loading workload specific functions running on the x86. Examples of such functions are cryptographic functions (encryption/decryption) or compression/decompression, though the flexibility of the FPGA allows for a large variety of off-load capabilities.

The reconfigurable regions in the FPGA can be programmed by the data owner or consumer, the manufacturer of system 100-B, or by a third party, using OpenCL, C, C++, or more traditional FPGA programming methods such as RTL for example. The FPGA vendor (e.g. Xilinx) provides a SDK interface for compiling, profiling, implementing and programming the reconfigurable regions. The FPGA accelerator module 336 is configured as a PCIe DMA-capable endpoint device, included as one of the several functions available on the multi-function PCIe endpoint 302. The PCIe interface also serves as the programming interface for the accelerator. This programming can be conducted in the form of live updates, without having to reprogram the entire FPGA, so interfaces such as PCIe and DDR can remain active while the accelerator is being reprogrammed.

The benefits of Application Off-load provided by module 336 are several. First, while results will vary based on work-load, there can be a significant performance gains (and power savings) over similar processing in the x86 domain of host processor 202. Second, by introducing a separate processing domain, data and execution can be isolated from the x86 domain. This can be advantageous for security reasons. For example, in the case of AES encryption, the keys and data transform are not occurring within the x86 domain, and thus, they are more secure from malicious software running on the x86 host. The data (the encryption keys, in this case) is never exposed to the x86, and managed separately through a separate side channel outside of x86. And thirdly, the acceleration taking place in the SPU can off-load x86 for other tasks, thereby increasing overall system performance.

Aspects of side-band management and control of encryption keys and other security functions performed by the secure complex 204 according to embodiments of the invention shown in FIG. 4 will now be described.

In embodiments, some, none or all of the NVMe drives in storage 106 of a server 110-B managed by secure complex 204 are provisioned by manager 116 and their access by host complex 202 is enabled through a certificate/key generated by manager 116 and programmed into modules 304 by secure processor 310 via key manager 306.

Accordingly, the NVMe drives become visible to the host complex 202 only once provisioned. More particularly, when an NVMe drive is in an unprovisioned state, the encryption/decryption keys are not installed and the host complex 202 will not be allowed to access that drive. In the provisioned state, the encryption/decryption keys for that drive are installed and the host subsystem 202 can access the drive. By default, prior to provisioning, the secure complex 204 assumes that all drives are in an unprovisioned state, upon either booting for the first time, or after being rebooted after being placed into an unprovisioned state as described in more detail below.

Figure 7A:
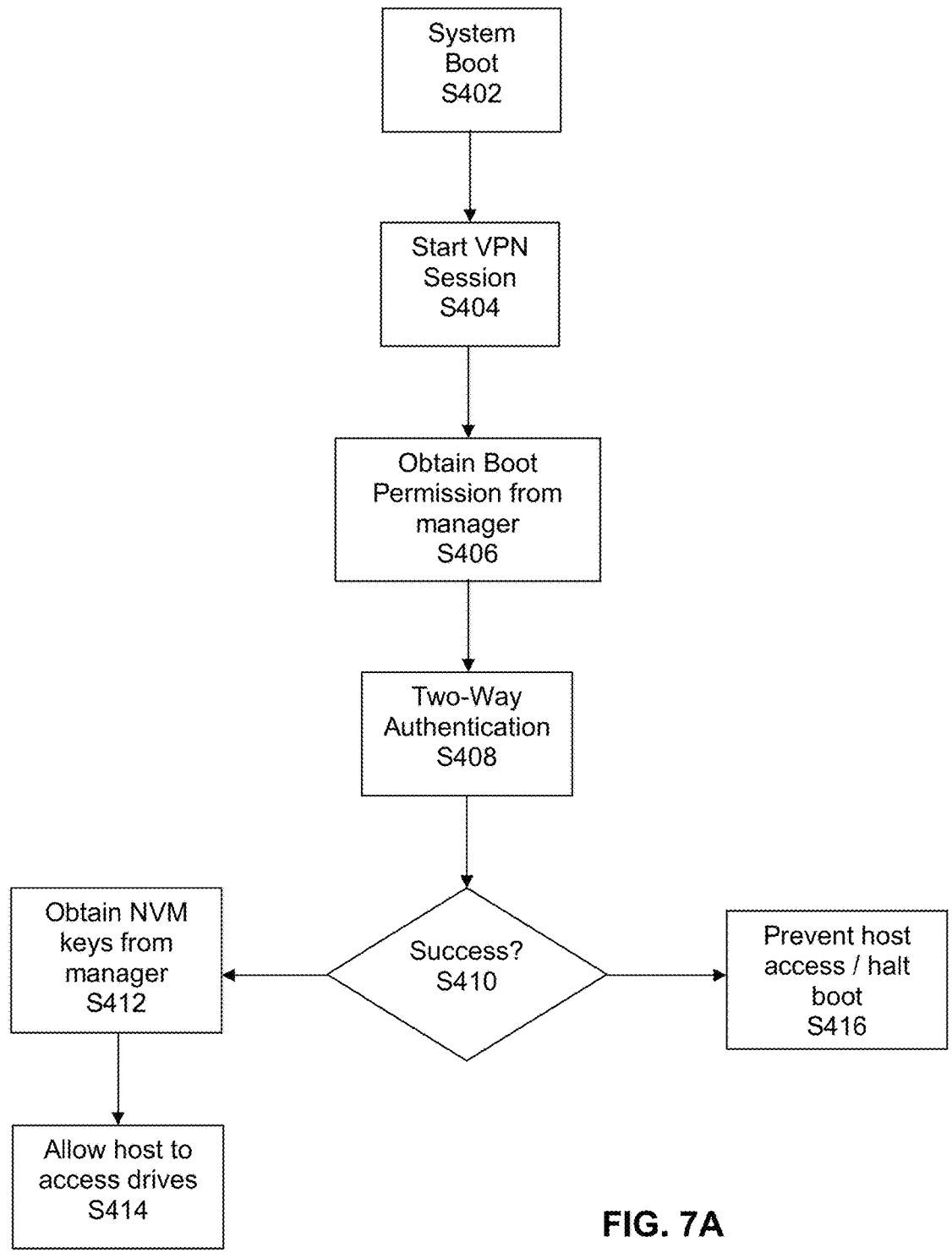
FIGS. 7A and 7B are flowcharts illustrating an example method for side-band management of security according to embodiments of the invention.

FIG. 7A is a flowchart illustrating an example side-band management method for secure server system provisioning according to embodiments of the invention.

As shown, in a first step S402 the system 100-B boots. In embodiments according to example shown in FIG. 4, the BIOS for the host complex 202's CPU is stored on the PCIe card implementing secure complex 204 so that it can be authenticated by secure complex 204 before being loaded by host complex 202. At the same time, BMC 232 boots from SPI Flash also stored on the PCIe card implementing secure complex 204, which can similarly authenticate the BMC code.

After the secure processor 310 completes its own boot cycle, and having been granted access to the CPU's BIOS memory, in step S404 secure processor 310 establishes a VPN session with the management server 116 over 1 GbE interface 312/314. This can be done through a secure key exchange with the user management software and the secure processor software, such as Diffie-Hellman Exchange or similar. In such an example, the peers first authenticate by certificates or via a pre-shared secret. In this phase, a Diffie-Hellman (DH) key is generated. The nature of the DH protocol is that both sides and independently create the shared secret, a key which is known only to the peers. After the keys are created, bulk data transfer can take place between secure processor and management server.

Upon establishing the VPN session, in step S406 the secure processor 310 communicates with manager 116, and determines access state. If allowed by manager 116, mutual authentication process with BIOS begins.

With authentication key 'K' programmed into TPM 236 (e.g. during Manufacturing Process), in step S408 host complex 202's CPU BIOS and the secure processor 310 perform a two-way mutual authentication. For example, using the shared mailbox PCIe endpoint 316, the host CPU's BIOS issues a challenge R1 to the secure processor 310, where R1 is a nonce generated by the BIOS. Using the shared mailbox PCIe endpoint 316, secure processor 310 returns f1(K,R1), where f1 is a transform that is known to the BIOS of host CPU 206. Next, also via the PCIe endpoint 316, the secure processor 310 issues a challenge R2 to the BIOS of host complex 202's CPU. The BIOS returns f2(K,R2), where f2 is a transform that is known to the secure processor 310.

Using the mutually known values of R1 and R2, as well as the previously stored trusted value of 'K' and the known transforms f1 and f2, the success of the mutual authentication process is determined by both the BIOS of host complex 202's CPU and the secure processor 310 in step S410. It should be noted that this determination in step S410 can be split into two separate steps, once after the BIOS challenge to the secure processor 310, and then if that was successful, for a final determination after the challenge by secure processor 310 to the BIOS of host complex 202's CPU.

If it is determined in step S410 that two-way authentication was not successful, it could either be because the host complex 202's BIOS failed the challenge from the secure complex 204 or because the secure complex 204 failed the challenge from the host complex 202's BIOS.

If the secure complex 204 failed the challenge from the host complex 202's BIOS, then the system 100-B boot process halts and the system 100-B is non-operational.

If the host complex 202's BIOS failed, the secure processor 310 maintains the drives in storage 106 in an unprovisioned state, and prevents their access by host complex 202.

In other embodiments, such as an example described in the co-pending U.S. application Ser. No. 14/846,768, secure processor 310 will overwrite the code with a secure BIOS image into the CPU's BIOS memory. Once the programming is complete and verified, processing may continue to step S412 and the secure processor 310 signals the host complex 202 via mailbox 316 to complete its boot cycle using the new BIOS code, as well as to obtain access to the storage 106.

In yet another example where host complex 202 controls the power on/off circuitry for system 100-B, the secure processor 310 will signal the host complex 202's BIOS via mailbox 316 to initiate a shutdown/sleep mode procedure (e.g. shutting down or suspending all drivers/processes, etc.), and secure processor 310 performs a shutdown/sleep procedure itself.

If authentication is successful as determined in step S410, the secure processor 310 changes the state of the drives in storage 106 from unprovisioned to provisioned.

Then once provisioning is enabled, in step S412 secure processor 310 receives NVMe keys via a key exchange with manager 116, by requesting and receiving the keys for each of the drives in storage 106 via the secure VPN connection. As set forth above, in embodiments, these keys include a unique AES-XTS pair for each drive. Then secure processor 310 then causes manager 306 to program the AES-XTS keys and tweak registers of each AES-XTS accelerators 304 associated with a respective NVMe drive in storage 106. After doing so, secure processor 310 sends a message to the host complex 202's BIOS that the programming is completed, and the BIOS, in response, allows for boot to take place over secure SATA boot interface 330.

It should be noted that this step S412 can also include the secure processor 310 receiving networking policies from the manager 116 and loading them into policies 213 for access by the network security and statistics block 320.

Next in step S414, enumeration proceeds. More particularly, now that the host complex 202's BIOS is allowed to access the NVMe drives as PCIe endpoints through NVMe and custom software driver included on the boot image on the secure SATA boot interface 330, the BIOS performs a standard PCIe device enumeration process, after which the host complex 202 sees each of the drives in storage 106 with their encryption/decryption keys in respective accelerators 304 programmed by secure processor 310 via manager 306.

After successful authentication and enumeration of drives in step S414, all subsequent operation of system 100-B is performed normally using encryption/decryption keys for securing all the data in storage 106 and using network security functions for data flowing through network connection 230 according to policies 213 in a provisioned state until secure un-provisioning takes place.

Figure 7B:
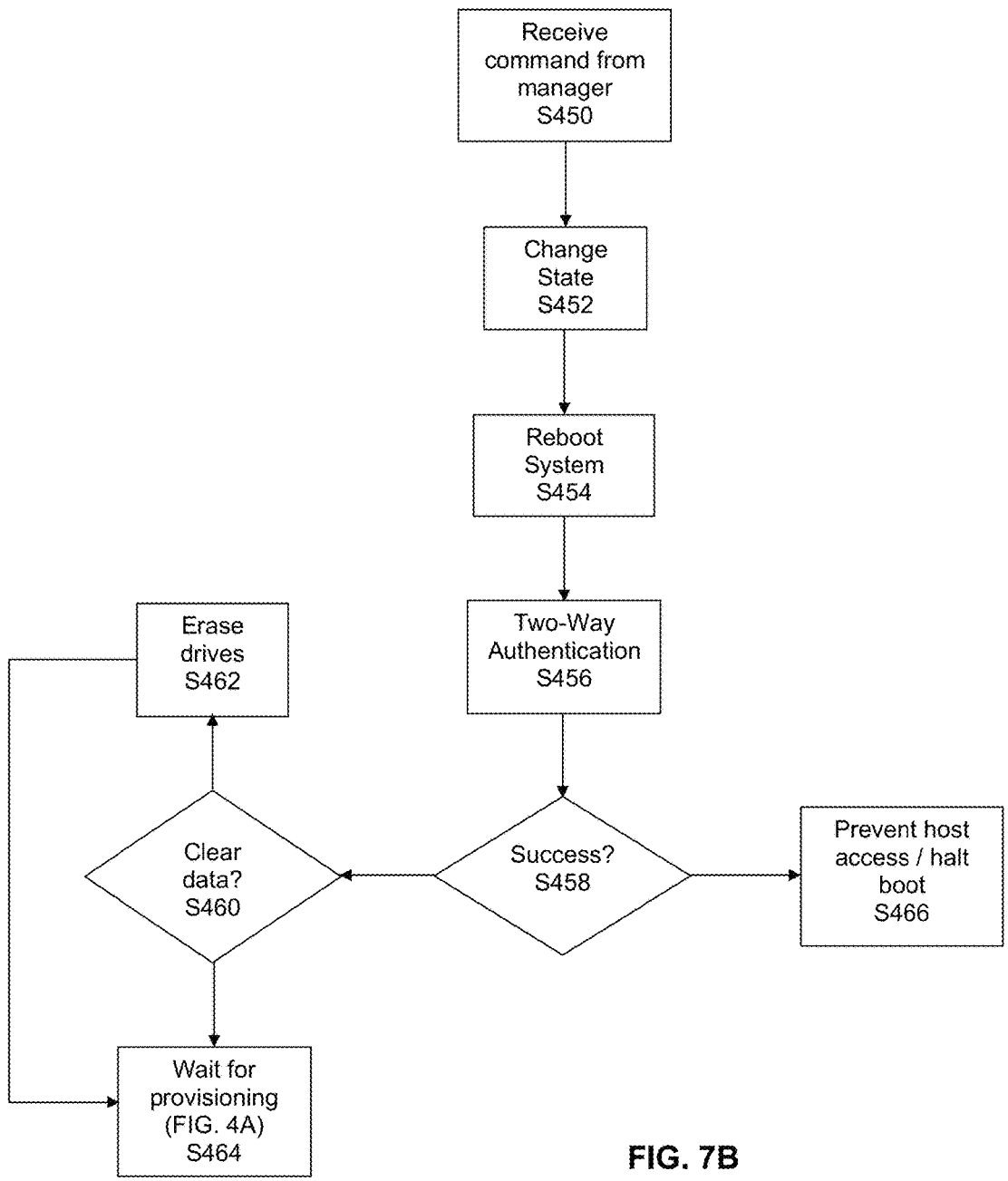

FIG. 7B is a flowchart illustrating an example method for managing secure un-provisioning of system 100-B according to embodiments of the invention such as that shown in FIG. 4.

In example embodiments, un-provisioning is controlled entirely by manager 116. In these examples, first in step S450 an un-provisioning command is sent from manager 116 via connection 118 and received by management interface 218 of secure complex 204. In embodiments, the un-provisioning command contains a CLEAR DATA flag which indicates whether data on the drives in storage 106 should be erased in addition to being taken out of service.

Once the un-provisioning command is received by the secure complex 204, in step S452 the secure processor 310 sets the state of the storage 106 to un-provisioned. In example embodiments described herein where the host complex 202 controls the power and reset circuitry of system 100-B, the secure processor 310 further sends a message via mailbox 316 to the CPU of host complex 202 to trigger a shutdown and reboot the system 100-B, and in step S454 the system 100-B re-boots. This step S454 further includes processing similar to steps S402 to S406 as described above in connection with the secure provisioning method in which the secure processor 310 establishes a secure VPN connection with the manager 116, obtains an authentication key and interacts with host complex 202's BIOS in an initial boot process.

Further similar to step S408 in the above-described provisioning method, in step S456, the host complex 202's BIOS and the secure processor 310 perform two-way authentication. If it is determined in step S458 that authentication was successful, the secure processor 310 determines in step S460 whether the CLEAR DATA flag is set. If so, in step S462, the secure processor 310 enumerates the NVMe drives in storage 106 and erases the data on the drives. After the data is erased, the secure processor releases its access to the NVMe drives in storage 106.

Whether or not the drives are erased, processing ends in step S464 where the system remains in and unprovisioned state and waits until provisioned. In some embodiments, even if the system is in an unprovisioned, the host complex 202 can be allowed to complete its boot process and operate (perhaps including execution of some or all of applications 205), but without any awareness of or access to drives in storage 106.

If it is determined in step S458 that authentication is not successful, processing proceeds to step S466. Similar to the processing in step S416 described above, in a case where the host complex 202's BIOS fails an authentication challenge from the secure processor 310, then the NVMe drives in storage 106 are made inaccessible to the host complex 202. In a case where the secure processor 310 fails the host complex 202 BIOS's challenge, then the system boot stalls and the system 100-B is non-operational.

Although the present invention has been particularly described with reference to the preferred embodiments thereof, it should be readily apparent to those of ordinary skill in the art that changes and modifications in the form and details may be made without departing from the spirit and scope of the invention. For example and without limitation, this can include incorporating scalability to more NVMe devices, adding NVMe-over-fabrics support, incorporating faster Ethernet interfaces, and implementing RAID functions on the NVMe interfaces. It is intended that the appended claims encompass such changes and modifications.

The invention claimed is:

1. A server system comprising:
   a host complex for running software applications that generate and use data;
   a secure complex; and
   storage that is at least partially provisioned by an external management entity that communicates with the secure complex, wherein the secure complex is configured to prevent access by the software applications currently running in the host complex to the data in the storage unless and until the storage is provisioned,
   wherein the storage comprises a plurality of drives, and wherein the secure complex, after the provisioning, is configured to allow the applications currently running in the host complex to access provisioned ones of the plurality of drives while preventing the applications from accessing non-provisioned ones of the plurality of drives.

* * * * *